US012152729B2

(12) United States Patent
Barclay et al.

(10) Patent No.: US 12,152,729 B2
(45) Date of Patent: Nov. 26, 2024

(54) SYSTEMS AND METHODS FOR TRANSPORTING LIQUEFIED NATURAL GAS

(71) Applicant: The Lisbon Group, LLC, Issaquah, WA (US)

(72) Inventors: Michael Barclay, Sammamish, WA (US); M. Josue Zapata, Seattle, WA (US)

(73) Assignee: The Lisbon Group, LLC, Mercer Island, WA (US)

( * ) Notice: Subject to any disclaimer, the term of this patent is extended or adjusted under 35 U.S.C. 154(b) by 172 days.

(21) Appl. No.: 16/489,999

(22) PCT Filed: Mar. 2, 2017

(86) PCT No.: PCT/US2017/020493
§ 371 (c)(1),
(2) Date: Aug. 29, 2019

(87) PCT Pub. No.: WO2018/160182
PCT Pub. Date: Sep. 7, 2018

(65) Prior Publication Data

US 2020/0025334 A1 Jan. 23, 2020

(51) Int. Cl.
*F25J 1/02* (2006.01)
*F17C 1/12* (2006.01)
(Continued)

(52) U.S. Cl.
CPC .................. *F17C 1/12* (2013.01); *F17C 9/02* (2013.01); *F25J 1/0022* (2013.01); *F25J 1/0037* (2013.01);
(Continued)

(58) Field of Classification Search
CPC ........ F25J 1/0022; F25J 1/0204; F25J 1/0072; F25J 1/0232; F25J 1/004; F25J 1/005;
(Continued)

(56) References Cited

U.S. PATENT DOCUMENTS 6,089,022 A 7/2000 Zednik et al.
6,244,053 B1 6/2001 Gulati et al.
(Continued)

FOREIGN PATENT DOCUMENTS

WO 2015110443 A2 7/2015

OTHER PUBLICATIONS

European Search Report for Application No. EP 17 89 8735 dated Jan. 15, 2021; 10 pgs.

*Primary Examiner* — Frantz F Jules
*Assistant Examiner* — Webeshet Mengesha
(74) *Attorney, Agent, or Firm* — Umberg Zipser LLP

(57) ABSTRACT

Systems and methods for transporting and managing LNG are contemplated. A source of LNG is pumped to a pressure higher than a consumer pressure, and is vaporized to provide vaporized LNG. The vaporized LNG is transported from a first location to a second location without the need for cryogenic equipment. At the second location, the vaporized LNG is expanded to the consumer pressure or a second pressure below the consumer pressure to generate refrigeration content suitable to reliquefy at least a portion of the vaporized LNG. A reliquefied natural gas is generated at the second location while providing a natural gas product to a downstream consumer at the consumer pressure.

17 Claims, 7 Drawing Sheets

(51) Int. Cl.
*F17C 9/02* (2006.01)
*F25J 1/00* (2006.01)

(52) U.S. Cl.
CPC ............. *F25J 1/004* (2013.01); *F25J 1/0052* (2013.01); *F25J 1/0087* (2013.01); *F25J 1/0204* (2013.01); *F25J 1/023* (2013.01); *F25J 1/0232* (2013.01); *F17C 2221/033* (2013.01); *F17C 2223/0161* (2013.01); *F17C 2223/033* (2013.01); *F17C 2225/0123* (2013.01); *F17C 2225/035* (2013.01); *F17C 2227/0135* (2013.01); *F17C 2227/0302* (2013.01); *F17C 2227/0393* (2013.01); *F17C 2265/05* (2013.01); *F17C 2270/0123* (2013.01); *F25J 2220/64* (2013.01); *F25J 2245/90* (2013.01); *F25J 2290/60* (2013.01)

(58) Field of Classification Search
CPC ........ F25J 1/0035; F25J 1/0037; F25J 1/0052; F25J 1/023; F17C 9/02; B63B 35/44; B63B 25/16
See application file for complete search history.

(56) References Cited

U.S. PATENT DOCUMENTS 6,298,671 B1 10/2001 Kennelley et al.
6,598,408 B1 7/2003 Nierenberg
6,688,114 B2 2/2004 Nierenberg
6,848,502 B2 2/2005 Bishop et al.
6,880,348 B2 4/2005 Bishop et al.
6,945,055 B2 9/2005 Bishop et al.
6,986,266 B2 1/2006 Narinsky
6,997,643 B2 2/2006 Wille et al.
7,069,743 B2 7/2006 Prim
7,216,507 B2 5/2007 Cuellar et al.
7,293,600 B2 11/2007 Nierenberg
7,308,863 B2 12/2007 de Baan
7,475,566 B2 1/2009 Schroeder et al.
7,574,856 B2 8/2009 Mak
7,600,396 B2 10/2009 Mak
7,603,867 B2 10/2009 Brown
8,110,023 B2 * 2/2012 Mak .......................... F17C 9/02 95/237
8,402,983 B2 3/2013 Harland et al.
8,695,376 B2 4/2014 Mak
8,794,029 B2 8/2014 Yokohata et al.
8,959,931 B2 2/2015 Mathews et al.
9,612,050 B2 * 4/2017 Palmer ..................... F25J 1/004
10,718,564 B2 * 7/2020 Matsubara ............. F25J 1/0022
2005/0061395 A1 3/2005 Pollack et al.
2005/0095068 A1 5/2005 Wille et al.
2006/0000234 A1 1/2006 Cuellar et al.
2006/0080973 A1 4/2006 Pollack et al.
2006/0180231 A1 8/2006 Harland et al.
2006/0231155 A1 10/2006 Harland et al.
2007/0101732 A1 5/2007 Mak
2007/0214804 A1 9/2007 Hannan et al.
2008/0127673 A1 6/2008 Bowen et al.
2008/0295527 A1 12/2008 Lee et al.
2009/0217701 A1 * 9/2009 Minta .................... F25J 1/0288 62/612
2010/0000215 A1 * 1/2010 Ramakrishnan ....... F25J 1/0232 60/641.2
2010/0031700 A1 * 2/2010 Wilkinson ............... F25J 1/023 62/620
2010/0126187 A1 * 5/2010 Mak .......................... F17C 7/04 62/619
2010/0147024 A1 6/2010 Roberts et al.
2010/0154471 A1 * 6/2010 Brown ................... F25J 3/0233 62/620
2011/0265494 A1 * 11/2011 Barclay .................. F25J 1/0219 62/45.1
2011/0297346 A1 12/2011 Minta et al.
2013/0036763 A1 2/2013 Vist et al.
2016/0231050 A1 * 8/2016 Faka ...................... F25J 1/0269
2018/0231303 A1 * 8/2018 Pierre, Jr. .............. F25J 1/0278

* cited by examiner

SYSTEMS AND METHODS FOR TRANSPORTING LIQUEFIED NATURAL GAS

FIELD OF THE INVENTION

The field of the invention is natural gas processing, especially as it relates to transporting and processing of liquefied natural gas ("LNG") at different locations.

BACKGROUND

LNG processing typically requires transport of LNG from a first location (e.g., an LNG carrier, a cryogenic road tanker, etc.) to a second location (e.g., regasification facility) to produce a finished product (e.g., natural gas for consumers). Transporting of LNG from a first to a second location can be accomplished by use of a pipeline. However, LNG transport by pipeline is capital intensive and requires highly specialized piping, insulation systems, materials, couplings, and design to manage low temperatures and keep the LNG extremely cold and in liquid state. In spite of high costs and challenging design, there remain a large number of LNG transfer operations that transport LNG over relatively short distances using a pipeline (e.g., typically less than 1-3 km).

One typical LNG transfer operation is ship-to-shore transport of LNG via cryogenic loading lines at an onshore LNG receiving terminal. In this case, a specialized LNG carrier ("LNGC") is used to transport LNG cargo to an onshore LNG terminal via cryogenic loading arms connecting the shore-side facilities to the LNGC loading manifold. Transport of LNG cargo is often accomplished using a jetty, an LNGC mooring system, cryogenic loading arms, insulated cryogenic LNG circulation and loading lines, and insulated cryogenic boil-off gas ("BOG") return lines to connect the LNG storage tanks to the LNGC. Unfortunately, the cost of the LNG offloading system can be quite high depending on the length of the jetty, water depth (e.g., shallow water ports), metocean conditions (e.g., rough seas), and the construction conditions of the shore-side facilities.

Gulati (U.S. Pat. No. 6,244,053) discloses a system and method for transferring cryogenic fluids (e.g., LNG). Gulati teaches cryogenic liquid transfer of LNG from a first LNG storage tank to a second LNG storage tank using transfer lines. The temperature within the transfer lines is maintained low enough to prevent the LNG from gasifying and forming a two-phased fluid. When the transfer operations are not ongoing, LNG is circulated to maintain the system at LNG temperatures to avoid thermal stress and leak potential associated with thermal cycling. However, as noted above, transporting LNG using cryogenic transfer lines can be quite expensive. Gulati and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Another typical LNG transfer operation involves natural gas liquids ("NGL") extraction or heating value adjustment. These schemes and methods typically rely on direct heat transfer with cold stored in an initial LNG source to recondense a final LNG product(s). Consequently, such schemes and methods require both the LNG source and final LNG product(s) to be co-located to facilitate heat transfer.

For example, Narisnky (U.S. Pat. No. 6,986,266) discloses a process and apparatus for LNG enriching in methane using a heat exchanger that recovers refrigeration content from an LNG source. The refrigeration content is used to liquefy a methane enriched stream derived from the LNG source. Such a heat exchanger as taught by Narisnky is referred to as a "recuperative heat exchanger" due to the thermal integration inherent in its design, which consequently requires the initial and final LNG streams be located in proximity to each other.

Recuperative heat exchangers have a range of benefits and configurations, including integrated power cycles with regasification as taught by Mak (U.S. Pat. Nos. 7,574,856 and 7,600,396) and production of multiple LNG and other products as taught by Brown (U.S. Pat. No. 7,603,867). Similarly, Schroeder (U.S. Pat. No. 7,475,566), Cuellar (U.S. Pat. No. 7,216,507), Prim (U.S. Pat. No. 7,069,743) and Yokohata (U.S. Pat. No. 8,794,029) disclose processes that use a recuperative heat exchanger and require co-location of an LNG source and LNG products.

Minta (U.S. Pat. Pub. 2011/0297346) discloses an alternative approach to the recuperative heat exchanger configurations discussed above. Minta teaches the use of a thermal regenerator to store cold energy from a LNG regasification facility for use in a liquefaction process at a second location. The thermal regenerator comprises a volume of high heat capacity materials configured to recover and store cold energy. Although Minta teaches an alternative to direct heat exchange with an LNG source, Minta requires use of high heat capacity materials and transport of such materials from a first location to a second location.

Mak (U.S. Pat. No. 8,110,023) discloses another alternative approach to recuperative heat exchanger configurations. Mak teaches offshore pumping LNG to supercritical pressure and vaporizing the pressurized LNG. The vaporized LNG is transported to an onshore facility where it is split into a first portion and a second portion. The first portion is processed to remove non-methane components, and combined with the second portion to form a sales gas having a predetermined composition and/or heating value. Unfortunately, this process can be problematic when pumping LNG to supercritical pressure is not desired.

Another typical LNG transfer operation involves a floating storage and regasification unit ("FSRU"). FSRUs combine some of the functional requirements of an onshore LNG receiving terminal with an LNGC. These facilities are able to eliminate some of the shore-side infrastructure including LNG loading arms, LNG loading lines, BOG lines, and onshore LNG storage tanks by integrating the regasification facilities into the topsides of LNGC or other type of floating LNG storage. A number of examples of FSRUs are seen in the prior art, including Zednik (U.S. Pat. No. 6,089,022), Hannan (U.S. Pat. Pub. 2007/0214804), Nierenberg (U.S. Pat. No. 6,688,114) and Willie (U.S. Pat. No. 6,997,643) that teach systems for offloading and regasifying LNG aboard an LNG carrier vessel. A third example is shown in Harland (U.S. Pat. No. 8,402,983), which teaches an offshore LNG regasification system in which a floating moored or dynamically positioned regasification plant is used to produce a natural gas stream.

FSRUs have been implemented in various production schemes. For example, Pollack (U.S. Pat. Pubs. 2006/0080973 and 2005/0061395) discloses FSRUs that direct regasified LNG cargos to a nearby reservoir for buffer storage as high pressure gas. In other examples, Mathews (U.S. Pat. No. 8,959,931) teaches the use of swapping temporary FSRUs to transport LNG between export and import terminals, and Harland (U.S. Pat. Pubs. 2006/0231155 and 2006/0180231) teaches use of smaller LNGC and FSRUs in various gas value chain arrangements. Although FSRU schemes minimize the need for cryogenic transfer of LNG, the natural gas supply from an FSRU to shore-side facilities can be disrupted under certain conditions (e.g., disconnecting FSRU for severe weather, operational problem with the FSRU, downtime while swapping mobile FSRU, etc.). Consequently, natural gas supply from an FSRU can be unreliable.

Thus, there is still a need in the art for improved LNG processing systems and methods that require transport of LNG from a first location to a second location in a cost effective and reliable manner.

SUMMARY OF THE INVENTION

The inventive subject matter provides apparatus, systems, and methods in which LNG can be transported from a first location to a second location in a vaporized and pressurized form to eliminate the need for cryogenic transfer couplings, special cryogenic equipment, cryogenic piping, and other high cost items used in known LNG transfer operations. Additionally, LNG at the first location can be pumped to a pressure above a consumer pressure to provide excess pressure that can be used to wholly or partially reliquefy the vaporized and pressurized LNG at the second location. Such excess pressure eliminates the need of (i) relying on direct thermal integration or cold recovery via co-located initial and final LNG streams in a recuperative heat exchanger, and (ii) using special high heat capacity materials to store cold energy from an initial LNG stream as used in known LNG transfer operations. Furthermore, the need for pretreatment of natural gas at the second location is decreased or eliminated.

In one aspect, a method of providing a reliquefied natural gas product at a second location is contemplated. LNG from an LNG source is provided at a first location. The LNG is pumped to a pressure above a consumer pressure to thereby form a pressurized LNG. As used herein, the term "consumer pressure" is defined as the pressure required by (i) a gas transmission system that delivers gas to a downstream consumer or (ii) a pipeline that delivers gas to a downstream consumer. Typical consumer pressures comprise 1-3 bar(g), 3-7 bar(g), 20-30 bar(g), and 45-57 bar(g) depending on the downstream consumer (e.g., industrial consumers, gensets, industrial frame gas turbines, aeroderivative gas turbines, etc.). The pressurized LNG is vaporized at the first location to thereby form a pressurized natural gas or vaporized LNG. The pressurized natural gas is transported from the first location to the second location at a non-cryogenic temperature. Thus, it should be appreciated that the need for costly cryogenic equipment is eliminated.

Once at the second location, at least a portion of the pressurized natural gas is expanded to a second pressure to generate refrigeration content. Typically, the second pressure is below the consumer pressure. However, it is contemplated that the second pressure can be equal to or above the consumer pressure. In some embodiments, the pressurized natural gas can be pre-cooled prior to its expansion. At least a portion of the pressurized natural gas is reliquefied using the refrigeration content to thereby form the reliquefied natural gas product. As noted above, there is no need to have both the LNG source and the reliquefied LNG product at the same location for direct thermal integration due to the excess pressure available in the pressurized natural gas to produce refrigeration content.

In some embodiments, the first location is offshore and the second location is onshore. For example, the first location can be an FSRU or a gravity-based structure ("GBS") and the second location can be an LNG production plant or an LNG regasification plant. However, in other embodiments, the first and second locations can both be onshore or offshore. Typically, the first location and second location are separated by at least two kilometers.

In another aspect, a method of providing a natural gas product to a downstream consumer is contemplated. A vaporized LNG at a pressure above a consumer pressure is provided at a first location. The vaporized LNG is transported to a second location. Once at the second location, at least a portion of the vaporized LNG is expanded to a second pressure to generate refrigeration content. At least a portion of the vaporized LNG is reliquefied using the generated refrigeration content to thereby form a mixed product stream.

The mixed product stream is separated into an overhead product stream and a reliquefied natural gas. The overhead product stream can be compressed to consumer pressure to thereby generate the natural gas product for the downstream consumer. It should be appreciated that the vaporized LNG can be expanded by use of a turboexpander to supply energy to the compressor. It is contemplated that the expansion of the vaporized LNG, pre-cooled vaporized LNG, mixed product stream, subcooled or dense-phase streams in the reliquefaction process can be completed by use of at least one of a turboexpander, a flashing liquid expander, a liquid turbine, and a expansion valve.

In some embodiments, the reliquefied natural gas product can be stored in a buffer storage tank. It is contemplated that the reliquefied natural gas can provide an alternative source of natural gas product for a downstream consumer when there is a disruption with the supply of natural gas to the downstream consumer. At least a portion of the reliquefied natural gas product can be pumped to consumer pressure, and vaporized to form a regasified LNG stream for the downstream consumer. Thus, natural gas supply to the downstream consumer is more reliable than other known processes.

In yet another aspect, an LNG processing system is contemplated. The system comprises a first facility having a source of LNG and a pump fluidly coupled to the source. The pump is configured to increase a pressure of LNG above a consumer pressure to form a pressurized LNG. The first facility further comprises a regasification unit coupled to the pump and configured to vaporize the pressurize LNG to form a pressurized natural gas at a non-cryogenic temperature. A pipeline fluidly couples the first facility and a second facility, and is used to transport the pressurized natural gas from the first facility to the second facility.

The second facility comprises a reliquefaction unit configured to receive the pressurized natural gas and form (i) a natural gas product at the consumer pressure and (ii) a reliquefied natural gas product. It is contemplated that an expansion device in the reliquefaction unit is configured to expand at least a portion of the pressurized natural gas to a second pressure below the consumer pressure to generate refrigeration content in an amount sufficient to form the reliquefied natural gas product.

Typically, the first facility is offshore and the second facility is onshore. However, it is contemplated that the first and second facilities can be onshore or offshore. It should be appreciated that the second facility can further comprise a buffer storage tank configured to receive and store the reliquefied natural gas product for use as an alternative source of generating a natural gas product at consumer pressure.

In another aspect, an LNG processing plant is contemplated. The plant comprises a source of vaporized pretreated LNG at a first location and at a predetermined pressure above a first consumer pressure and a second consumer pressure. A pipeline is coupled to the first location and a second location to transport the vaporized pretreated LNG from the first location to the second location. It is contemplated that the second location comprises a gas distribution network.

A first reliquefaction unit at the second location is configured to receive a first portion of the vaporized pretreated LNG, and form (i) a first reliquefied natural gas product and (ii) a first natural gas product at the first consumer pressure. A high pressure distribution network is configured to receive and distribute the natural gas product at the first consumer pressure to downstream consumers. A second reliquefaction unit at the second location is configured to receive a second portion of the vaporized pretreated LNG, and form (i) a second reliquefied natural gas product and (ii) a second natural gas product at the second consumer pressure. A low pressure distribution network is configured to receive and distribute the natural gas at the second consumer pressure to downstream consumers. Preferably, the first consumer pressure is greater than the second consumer pressure. Thus, reliquefaction units can be integrated into gas distribution network having various consumer pressures to generate reliquefied natural gas at different points in the network.

In one aspect, a method of providing an LNG buffer for a regasification plant is provided. The method comprises providing pretreated LNG from an LNG source and vaporizing the LNG to provide a pretreated natural gas stream. The pretreated natural gas stream is transported from a first location to a second location. A first portion of the pretreated natural gas stream is reliquefied to produce a reliquefied natural gas product. The reliquefied natural gas product is stored in an LNG buffer storage tank. A second portion of the pretreated natural gas stream is fed to a downstream consumer at a supply rate. At least a portion of the reliquefied natural gas product is regasified to form a regasified LNG stream. The regasified LNG stream can be fed to the downstream consumer when the supply rate falls below a predetermined threshold to thereby increase the supply rate to at least the predetermined threshold. Thus, as noted above, gas supply to the downstream consumer is more reliable than other known supply processes.

It should be appreciated that the various systems and methods described above can be integrated in an NGL extraction process. In some embodiments, LNG from an LNG source is pumped to a pressure above a consumer pressure to thereby form pressurized LNG. The pressurized LNG is vaporized at a first location to thereby form a pressurized natural gas. The pressurized natural gas is transported from the first location to the second location. Once at the second location, at least a portion of the pressurized natural gas is processed to remove non-methane components and form a lean natural gas. At least a portion of the lean natural gas is expanded to a second pressure to generate refrigeration content in an amount sufficient to liquefy at least a portion of the lean natural gas and form the reliquefied natural gas.

Viewed from another perspective, a method of providing a natural gas product at a second location is contemplated. LNG from an LNG source is pumped to a pressure above a consumer pressure to thereby form pressurized LNG. The pressurized LNG is vaporized at a first location to form a pressurized natural gas, and the pressurized natural gas is transported from the first location to the second location. At least a portion of the pressurized natural gas is expanded to a second pressure to generate refrigeration content. It is contemplated that the refrigeration content is used to reliquefy at least portion of the pressurized natural gas to form a mixed product stream. The mixed product stream is separated into an overhead product stream and a reliquefied natural gas product. At least a portion of the overhead product stream is processed to remove at least some non-methane components and form a lean natural gas product. The lean natural gas product can be compressed to the consumer pressure to form the natural gas product using at least some energy produced by the expansion of the pressurized natural gas.

Various objects, features, aspects and advantages of the inventive subject matter will become more apparent from the following detailed description of preferred embodiments, along with the accompanying drawing figures in which like numerals represent like components.

DETAILED DESCRIPTION

The inventors have discovered improved LNG processing schemes involving first and second locations that (i) eliminate the need for costly cryogenic equipment needed for transport of LNG, (ii) decrease, or eliminate, liquefaction power at the second location, (iii) decrease or eliminate the need for natural gas pretreatment associated with typical natural gas liquefaction, and (iv) improve reliability of a natural gas supply to downstream consumers. LNG is pumped to a pressure above a consumer pressure LNG and vaporized to thereby form a pressurized natural gas at a first location. The pressurized natural gas is typically transported from the first location to a second location at a non-cryogenic temperature. Once at the second location, at least a portion of the pressurized natural gas is expanded to a second pressure to generated refrigeration content. The refrigeration content is used to reliquefy at least a portion of the pressurized natural gas to thereby form a reliquefied natural gas product. It should be appreciated that reliquefaction power is reduced, or even eliminated, by use of the pressure between the pressurized natural gas and the consumer pressure to generate refrigeration content for reliquefaction.

The pressurized natural gas can be partially or wholly reliquefied using refrigeration content produced by the excess pressure and/or by other external refrigeration. In embodiments that involve partial reliquefaction, a mixed stream is formed that can be separated into a reliquefied natural gas product and an overhead product stream. The overhead product stream can be compressed to consumer pressure to thereby generate a natural gas product for a downstream consumer. Preferably, at least a portion of the power to compress the overhead product stream is supplied by the expansion of the pressurized natural gas (e.g., expansion via a turboexpander or other suitable expansion device).

Viewed from another perspective, the reliquefied natural gas product can be stored in a buffer tank at the second location. It is contemplated that the reliquefied natural gas product can be stored for use when a primary source of natural gas at the second facility is disconnected or is otherwise unavailable. This can occur when an FSRU is disconnected due to severe weather, there is an operational problem with an FSRU, or during downtime while swapping mobile FSRUs. In such instances, the flow of natural gas to downstream consumers can be disrupted. Advantageously, the reliquefied natural gas product in the buffer tank can be regasified to supply natural gas to downstream consumers when the primary source is disrupted. Thus, the reliability of natural gas to downstream consumers is improved.

Figure 1:
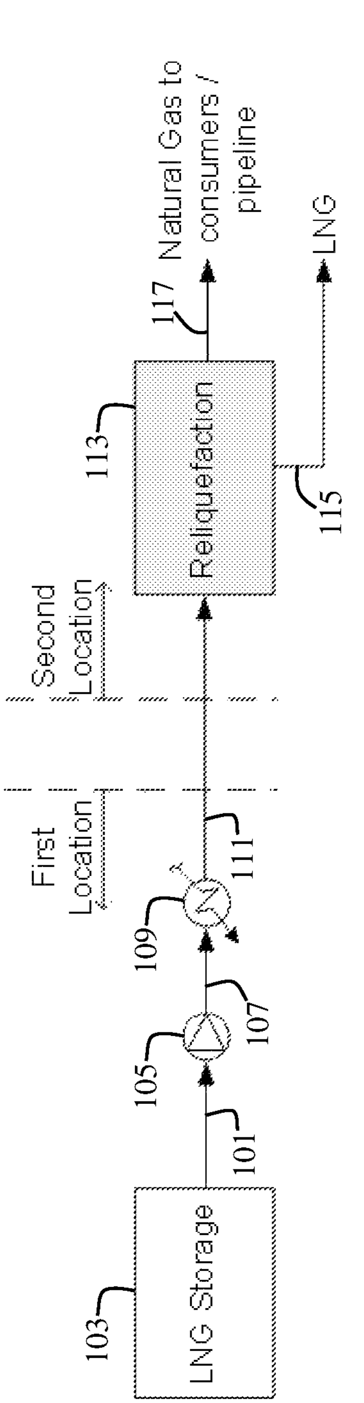
FIG. 1 is an exemplary configuration of LNG processing having regasification at a first location and partial reliquefaction at a second location.

An exemplary scheme of an LNG processing in a first location and a second location is depicted in FIG. 1. Here, LNG 101 from an LNG source 103 is provided in a first location. A pump 105 receives LNG 101 and pumps LNG 101 to a pressure above a consumer pressure to form pressurized LNG 107. A vaporizer 109 receives pressurized LNG 107 to form a pressurized natural gas 111 (also referred to as vaporized LNG). Typically, pressurized natural gas 111 is in a gas phase (or a dense gas-like phase) near ambient temperature. As shown in FIG. 1, pressurized natural gas 111 is formed from LNG 101 in the first location.

Pressurized natural gas 111 is transported from the first location to the second location. Typically, the first location is offshore and the second location is onshore. It is contemplated that a pipeline can transport pressurized natural gas 111 from the first location to the second location. Once at the second location, pressurized natural gas 111 is received by a reliquefaction unit 113 configured to expand at least a portion of pressurized natural gas 111 to a second pressure to generate refrigeration content. Typically, the second pressure is below the consumer pressure. However, it is contemplated that the second pressure can be equal to or greater than the consumer pressure. At least a portion of pressurized natural gas 111 is reliquefied using the refrigeration content to thereby form a reliquefied natural gas product 115.

It is contemplated that a natural gas product 117 is produced by reliquefaction unit 113. In some embodiments, a second portion of pressurized natural gas 111 can be expanded to the consumer pressure to form natural gas product 117 while also providing refrigeration content for pre-cooling and/or reliquefying pressurized natural gas 111. Additionally, or alternatively, an overhead product stream can be generated when the portion of pressurized natural gas 111 is expanded to a second pressure, such that the overhead product stream can be compressed to consumer pressure to provide at least a portion of natural gas product 117.

LNG 101 can be provided by many suitable LNG sources. For example, LNG source 103 can be any LNG terminal including an onshore LNG receiving terminal, and onshore LNG production facility, or an offshore FSRU. More specifically, LNG source 103 can be a storage tank located on (i) an offshore FSRU or GBS connected to shore by subsea pipeline to shore, (ii) a nearshore FSRU moored at a jetty and connected to shore by traditional loading arms or flexible hoses, or (iii) onshore at a traditional LNG receiving terminal such as Lake Charles, Elba Island or Cove Point.

Preferably, LNG 101 has been pretreated, which means that a number of impurities were removed from a natural gas before it was liquefied and turned into LNG 101. For example, some impurities that can be removed from natural gas include water, $CO_2$, benzene, and $C_5^+$ components that are subject to freezing at LNG temperatures. Typical requirements and technology for pretreatment of LNG 101 are shown in the table below. It is contemplated that removal of at least one of the impurities listed in the table below constitutes pretreatment.

TABLE 1

Impurities Requiring Removal from Natural Gas

| Impurity | Specification Required | Prime Technology | Alternate |
|---|---|---|---|
| $CO_2$ | <50 ppm(v) | Amine | Molecular sieve |
| $H_2O$ | <1 ppm(v) | Molecular sieve | |
| Sulphur | ~a few ppm(v) | Amine/molecular sieve | Guard bed |
| Mercury | <10 ng/Nm$^3$ | Sulphur impregnated carbon | Puraspec materials (Metal sulphides) |
| C5+ components | <0.1 mol % | Scrub column | NGL extraction facilities |
| Benzene | <5 ppm(v)/<2 ppm(v) | Scrub column | NGL extraction facilities |

It should be appreciated that pretreatment of LNG 101 facilitates reliquefaction to form reliquefied natural gas product 115 with no or minimal pretreatment (e.g., molecular sieve dehydration and $CO_2$ removal) of pressurized natural gas 111 at the second location. For example, minimal pretreatment at the second location can comprise molecular sieve dehydration to remove water from pressurized natural gas 111. Pretreatment facilities that remove impurities from natural gas typically represent 25-40% of the CAPEX of an LNG facility (excluding storage), and produce waste gas streams that need to be burned, vented, or flared. Additionally, pretreatment facilities and associated mitigation measures (e.g., flare, vents, etc.) often make an LNG facility more complex, which can result in lower availability and higher OPEX. These requirements can complicate and prolong an environmental permitting process for a LNG facility. Thus, reliquefaction of natural gas from pressurized natural gas 111 (or vaporized LNG) offers significant benefits.

As shown in FIG. 1, pump 105 receives LNG 101 to form pressurized LNG 107 at a pressure above a consumer pressure. Typically, pressurized LNG 107 has a pressure between 10 and 100 bar and the consumer pressure is between 1 and 50 bar. However, pressurized LNG 107 can have a pressure below or above that range as long as it is higher than the consumer pressure. It is contemplated that pressurized LNG 107 is at least 5 bar, at least 10 bar, at least 20 bar, at least 50 bar, or at least 100 bar greater than the consumer pressure of at least some downstream natural gas consumers to provide excess pressure to generate refrigeration content for liquefaction at the second location.

There are a number of arrangements suitable to pump LNG 101, such as multiple pump stages outside an LNG storage tank, a combination of in-tank LNG pump to external high pressure LNG pump, or high head reciprocating pump. It is contemplated that pressurized LNG 107 leaving pump 105 has been increased in pressure to a level exceeding at least some downstream natural gas consumers. This excess pressure allows an expansion-based reliquefaction at the second location, which is away from LNG source 103 in the first location.

Preferably, pumping LNG 101 from LNG source 103 is done in proximity to LNG source 103 to minimize the cryogenic piping and the extent of cryogenic equipment and secondary containment. This will typically be accomplished using two sets of pumps. A first pump is typically submerged in an LNG storage tank (e.g., cargo pumps in the case of an FSRU or in-tank pumps for onshore LNG storage tanks). This pump is generally a relatively low-head LNG transfer pumps to direct the LNG to the suction of a second set of pumps that are typically multi-stage high-head pumps capable of achieving suitable send-out pressures in excess of a consumer pressure (e.g., pressure of the downstream pipeline and industry gas requirements).

It should be appreciated that pumping a liquid (e.g., LNG) is thermodynamically efficient relative to achieving the same increase in pressure of the equivalent vapor. This means that pumping LNG 101, while in a liquid state, to a pressure above that required by downstream gas consumers, is a thermodynamically efficiency and extremely cost-effective way to prepare the LNG for reliquefaction in a downstream location. An example of this thermodynamic efficiency was simulated under idealized compression/pump (e.g., 100% adiabatic efficiency) for a 1 ton per hour LNG stream containing 95% $C_1$, 3% $C_2$, 1% $C_3$ hydrocarbons, and 1% $N_2$ to be increased in pressure from 0.125 bar(g) to 9 bar(g). In such example, pumping an LNG in liquid phase required 0.56 kW while compressing an LNG vapor required 104.4 kW, which is about 185 times more power than pumping the LNG in liquid phase.

Vaporizer 109 receives pressurized LNG 107 to form pressurized natural gas 111. Preferably, vaporizer 109 warms and vaporizes pressurized LNG 107 to turn it into pressurized natural gas 111 at a pressure above that required by at least a portion of the downstream natural gas consumers. It is contemplated that the pressure of the pressurized natural gas 111 is the same pressure, or substantially the same pressure, as pressurized LNG 107. Vaporization can be accomplished through a variety of means including open and closed loop vaporization schemes, such as submerged combustion vaporization ("SCV"), close-loop propane vaporization, ambient air vaporization, and seawater vaporization. It should be appreciated that pressurized natural gas 111 is preferably at a temperature that eliminates specialized handling due to cryogenic low temperatures. The temperature of pressurized natural gas 111 will depend on project specific details of at least the first and second locations.

Pressurized natural gas 111 is transported from the first location to the second location. It should be noted that the first location and the second location are different locations. In some embodiments, the first location is offshore and the second location is onshore. It is contemplated that the first location can be FSRU, a GBS, an LNG production plant, or an LNG receiving terminal, and the second location can be an LNG production plant, a pipeline compressor station, a pressure reduction station, or a similar natural gas distribution facility. It is contemplated that the first location and the second location can be separated by a distance of at least one kilometer, at least two kilometers, at least 10 kilometers, and at least 100 kilometers.

It should be appreciated that there is no recuperative heat transfer or heat integration between the first location and the second location. In other words, reliquefaction at the second location is accomplished without thermal integration with LNG 101 at the first location. Thus, LNG 101 and LNG source 103 does not need to be co-located with reliquefaction unit 113 in the second location as is required by arrangements described in the prior art having recuperative heat exchangers. In contrast, the excess pressure imparted to LNG 101 in the pumping stage can be used to reliquefy at least a portion of pressurized natural gas 111 to thereby produce reliquefied natural gas product 115 and a natural gas stream 117 at the consumer pressure.

After transport to the second location, pressurized natural gas 111 can be partially reliquefied in reliquefaction unit 113. Furthermore, natural gas stream 117 suitable for further transport to a downstream consumer is also generated by reliquefaction unit 113. It is contemplated that reliquefaction of pressurized natural gas 111 can be accomplished by expansion of at least a portion of pressurized natural gas 111 to reduce the temperature and affect liquefaction of a portion of the stream. Although partial reliquefaction is shown in FIG. 1, it should be appreciated that reliquefaction unit 113 can be configured to completely reliquefy pressurized natural gas 111.

Suitable expansion processes include using a JT valve, expansion valve, turboexpander, flashing expander, and liquid turbines. Furthermore, expansion can be performed in single and multiple expansion stages with or without precooling or supplemental refrigeration or compression of pressurized natural gas 111. It is possible that isenthalpic expansion through a valve or isentropic expansion through devices such as hydrocarbon turboexpanders or flashing expanders, or a combination of the two can be used based on project-specific requirements and economics. Additionally, or alternatively, any combination of precooling, mixed refrigerant, and $N_2$ expanded hybrid process arrangements are also contemplated. It should be appreciated that the overall process benefits from the excess pressure available from the high pressure vaporized LNG stream intentionally added at the LNG source location to a pressure above the downstream gas demand.

Figure 2:
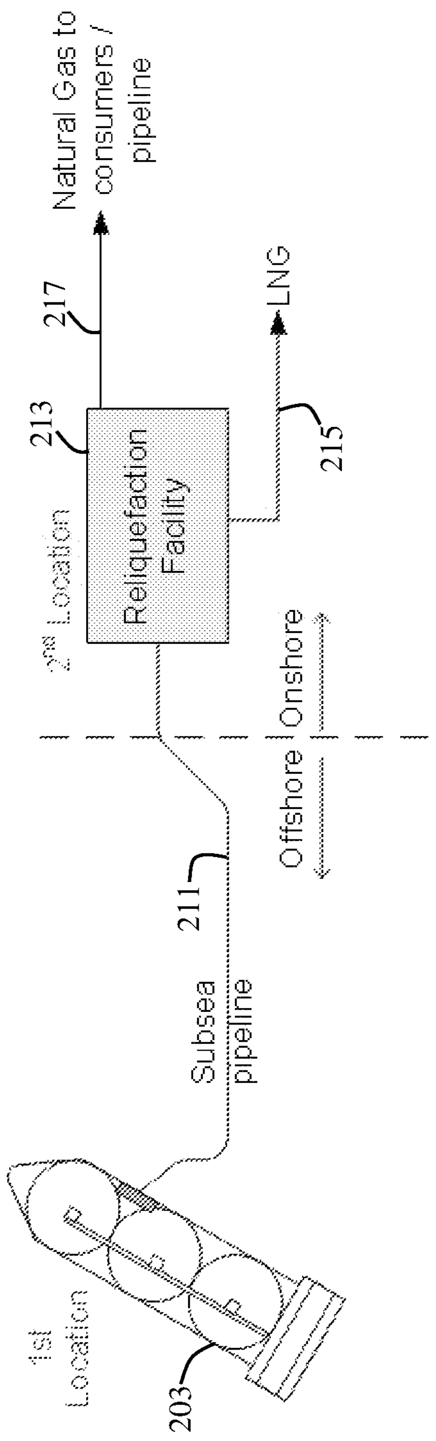
FIG. 2 is an exemplary configuration of offshore LNG regasification with onshore partial reliquefaction.

An exemplary configuration of offshore LNG regasification with onshore partial reliquefaction is shown in FIG. 2. LNG source 203 is located on an FSRU, which pumps LNG to a pressure above a consumer pressure and vaporizes the pressurized LNG to form vaporized LNG 211. For example, LNG can be pumped to 70 bar(g) prior to vaporization, which is higher than a consumer pressure of 40 bar(g) for a gas network. Vaporized LNG 211 is transported from a first location to a second location that is onshore. It is contemplated that vaporized LNG 211 can be transported by a subsea pipeline.

A reliquefaction unit 213 receives vaporized LNG 211 to thereby generate a reliquefied natural gas product 215 and a natural gas product 217 for downstream consumers. It is contemplated that there may be some pressure loss in transporting vaporized LNG 211 from the first location to the second location. For example, vaporized LNG 211 can be pumped to 70 bar(g) at the first location and fall to a pressure of 65 bar(g) upstream of reliquefaction unit 213 at the second location. In such example, there is excess pressure available of 25 bar(g) between the pressure of vaporized LNG 211 of 65 bar(g) and a consumer pressure of 40 bar(g) that is available to generate reliquefied natural gas 215 and natural gas product 217 for downstream consumers.

It is also contemplated that vaporized LNG 211 is separated into different streams as needed to generate reliquefied natural gas product 215. For example, vaporized LNG 211 can be separated into a first stream and a second stream. The first stream can be expanded to consumer pressure to provide refrigeration content for pre-cooling and/or reliquefying vaporized LNG 211. The second stream can be expanded to a pressure below consumer pressure (e.g., 1 bar(g)) to generate refrigeration content sufficient to reliquefy the second stream and produce reliquefied natural gas product 215.

Figure 3:
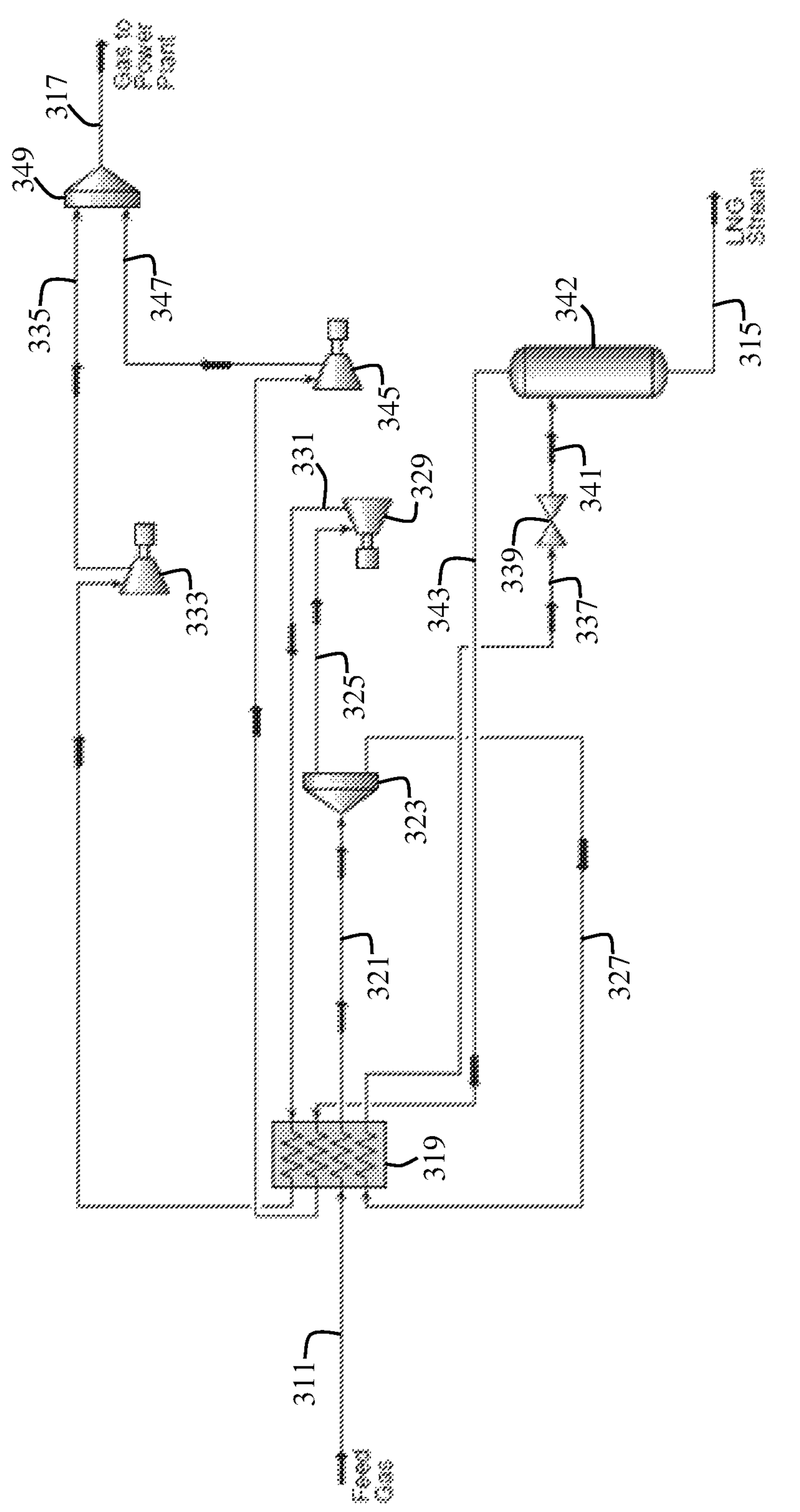
FIG. 3 is an exemplary configuration of a reliquefaction unit.

An exemplary configuration of a reliquefaction unit is depicted in FIG. 3. Vaporized LNG 311 at a pressure greater than a consumer pressure from a first location can be provided to a second location. For example, the first location can be an FSRU that provides 70 Mmscfd gas to a power plant approximately 2 kilometers onshore that requires a minimum consumer pressure of 5 bar(g) for a set of gensets. In such example, LNG can be pumped from approximately 10 bar(g) to 20 bar(g) to generate excess pressure for reliquefaction at the second location. It is contemplated that vaporized LNG 311 can be derived from LNG that was pretreated.

Vaporized LNG 311 is cooled in a heat exchanger 319 to thereby form a cooled product stream 321. Typically, vaporized LNG 311 is at approximately ambient temperature, such as a temperature between 10° C. and 25° C. Cooled product stream 321 is separated by a splitter 323 into a first stream 325 and a second stream 327. First stream 325 is expanded in an expander 329 to produce an expanded first stream 331, which is sent to heat exchanger 319 to provide cooling to at least one of vaporized LNG 311 and second stream 327. In some embodiments, first stream 325 can be expanded to a pressure below a consumer pressure to form expanded first stream 331. However, it is also contemplated that first stream 325 can be expanded to a pressure equal to or greater than the consumer pressure to form expanded first stream 331 to reduce, or eliminate, the need to compress expanded first stream 331 to consumer pressure.

A compressor 333 can receive expanded first stream 331 to increase the pressure of expanded first stream 331 to the consumer pressure. It is contemplated that at least a portion of the compression energy is obtained from expansion of first stream 325 in expander 329. Once compressed, a first portion 335 of a natural gas product 317 is generated.

Second stream 327 is pre-cooled in heat exchanger 319 to generate a cooled second stream 337. An expander 339 receives cooled second stream 337 and expands cooled second stream 337 to a second pressure below the consumer pressure to form a mixed product stream 341. For example, it is contemplated that cooled second stream 337 is expanded from approximately 20 bar(g) to a second pressure between 1-3 bar(g), and that the consumer pressure is a minimum of 5 bar(g) for a power plant. In such example, it should be appreciated that the excess pressure can be greater than the difference between the pressure of vaporized LNG 311 and the consumer pressure to thereby generate even more refrigeration content. A separator 342 receives mixed product stream 341 to produce a reliquefied natural gas product 315 and an overhead product stream 343.

It is contemplated that an LNG yield of at least 5% and more preferably 10% can be provided in reliquefied natural gas product 315. Additionally, pumping LNG in a liquid state at a first location to produce excess pressure reduces the total reliquefaction power (i.e., power used to create excess pressure at first location and power to compress overhead product 343) to approximately 32% of the compressor power required for the same process using only gas compression, rather than LNG pumping.

It should be appreciated that generating reliquefied natural gas product 315 adjacent to a power plant can have numerous benefits. One benefit is increased reliability of the gas supply to the power plant by storing reliquefied natural gas product 315, which can be regasified, adjacent to the power plant. Another benefit is that it allows seeding the gas market with customers in advance of a gas distribution pipeline through LNG deliveries by truck. If reliquefied natural gas product 315 is located at shore, then it is contemplated that it can serve marine consumers or can be transported via marine transport to other remote locations. Finally, it provides greater market penetration by allowing remote customers to be reached sooner with a reliquefied natural gas product that can be vaporized and used as natural gas.

Overhead product stream 343 can be sent to heat exchanger 319 to provide cooling to at least one of vaporized LNG 311 and second stream 327. Overhead product stream 343 is then compressed in a compressor 345 to the consumer pressure to form a second portion 347 of natural gas product 317. It should be appreciated that at least a portion of the compression energy can be supplied by expansion of at least one of cooled second stream 337 and first stream 325. First portion 347 and second portion 335 of natural gas product 317 can be combined in a mixer 349 to supply downstream consumers.

It should be appreciated that liquefaction efficiency of the reliquefaction unit embodiment shown in FIG. 3 offers a vast improvement over known prior art methods. Liquefaction efficiency has been expressed using a kW/TPD metric where the kW refers to the total liquefaction compressor power divided by the tonnes per day of LNG produced. Many known liquefaction processes have an efficiency of at least 12 kW/TPD. In contrast, the liquefaction efficiency measured by the reliquefaction unit in FIG. 3 is 5.5 kW/TPD, which is a considerable improvement over other known liquefaction processes.

Figure 4:
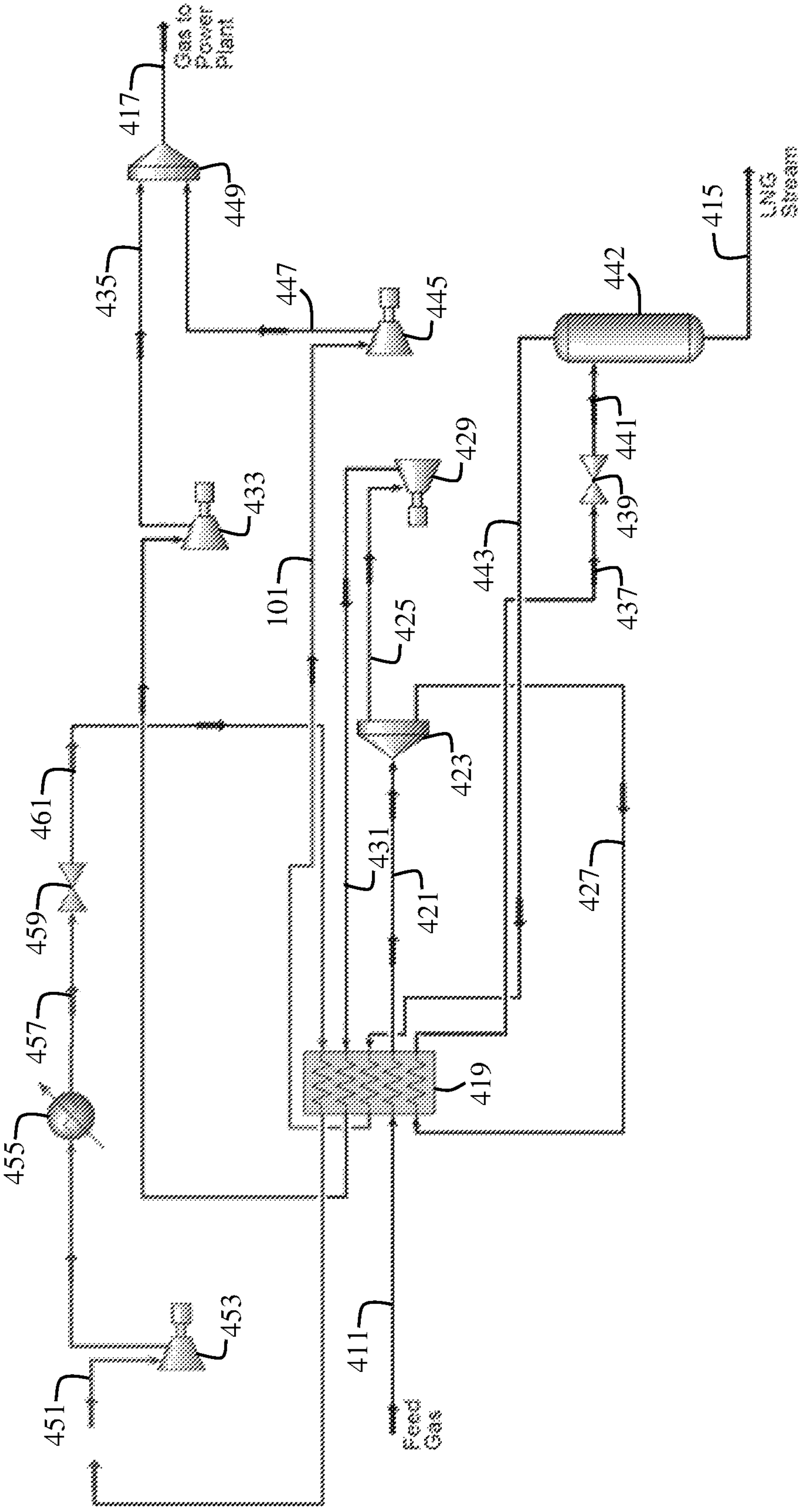
FIG. 4 is an exemplary configuration of a reliquefaction unit with a pre-cooling cycle.

An exemplary configuration of another reliquefaction unit is depicted in FIG. 4. The reliquefaction unit of FIG. 4 is similar to that shown in FIG. 3, but further includes an open-cycle refrigeration cycle using a heat transfer medium (e.g., propane). Vaporized LNG 411 from a first location is provided to the reliquefaction unit at a second location. Preferably, vaporized LNG 411 has a pressure greater than a consumer pressure to provide excess pressure for reliquefaction. For example, the first location can be an FSRU that provides 70 Mmscfd gas to a power plant approximately 2 kilometers onshore that requires a minimum consumer pressure of 5 bar(g) for a set of gensets. In such example, LNG can be pumped from approximately 10 bar(g) to 20 bar(g) to generate excess pressure for reliquefaction at the second location.

Vaporized LNG 411 at approximately ambient temperature is pre-cooled in a heat exchanger 419 to form a cooled product stream 421 that is separated in a splitter into a first stream 425 and a second stream 427. Similar to the reliquefaction unit in FIG. 3, first stream 425 is expanded in an expander 429 to produce an expanded first stream 431, which provides cooling to at least one of vaporized LNG 411 and second stream 427. It is contemplated that first stream 425 can be expanded to consumer pressure or to a second pressure below or above the consumer pressure. Once heated, expanded first stream 431 can be compressed to the consumer pressure in a compressor 433 to provide a first portion 435 of a natural gas product 417.

Second stream 427 is cooled in heat exchanger 419 to form a cooled second stream 437. Cooled second stream 437 is expanded to a second pressure below consumer pressure using an expander 439. For example, it is contemplated that cooled second stream 437 is expanded from approximately 20 bar(g) to a second pressure between 1-3 bar(g), and that the consumer pressure is a minimum of 5 bar(g) for a power plant. A mixed product stream 441 is formed that is separated into a reliquefied natural gas product 415 and an overhead product 443 in a separator 442. It should be appreciated that an external source of refrigeration can be supplied to mixed product stream 441 to generate additional reliquefied natural gas product 415 or to reliquefy the entire mixed product stream 441.

Overhead product 443 can be used to provide cooling to at least one of vaporized LNG 411 and second stream 427 in heat exchanger 419. It should be appreciated that additional natural gas product 417 can be generated from overhead product 443. A compressor 445 can compress overhead product 443 to the consumer pressure to form a second portion 447 of natural gas product 417. First portion 435 and second portion 447 of natural gas product 417 can be combined in a mixer 449 to supply downstream consumers.

An optional pre-cooling cycle can supply additional refrigeration content to at least one of vaporized LNG 411 and second stream 427 in heat exchanger 419. A heat transfer medium 451 can be compressed in a compressor 453 and cooled using a cooler 455 to form a compressed heat transfer medium stream 457. Compressed heat transfer medium stream 457 can be expanded to generate refrigeration content using an expander 459. A cooled heat transfer medium stream 461 provides cooling to at least one of vaporized LNG 411 and second stream 427 in heat exchanger 419 to increase production of reliquefied natural gas product 415. It should be noted that the additional pre-cooling cycle improves the efficiency to 5.1 kW/TPD, which is more efficient than the process depicted in FIG. 3. Additionally, LNG yield in reliquefied natural product 415 is improved from about 10% in the reliquefaction unit of FIG. 3 to 11% in the reliquefaction unit of FIG. 4. It should be appreciated that the pre-cooling can be modified to produce much higher yields (e.g., up to 100%). Additionally, or alternatively, it is contemplated that a slip-stream of pressurized vaporized LNG can be indirectly cooled, liquefied and subcooled to generate LNG with the same composition as the pipeline gas.

Exemplary reliquefaction units of FIGS. 3 and 4 can be incorporated in the LNG processing schemes discussed herein (e.g., LNG processing schemes of FIGS. 1-2, etc.) to generate a reliquefied natural gas product. It should be appreciated that a reliquefied natural gas product can be generated at a second location from a pressurized natural gas produced at a first location. The storage location of the reliquefied natural gas product can be flexibly sited based on land availability, suitability of the site, required storage capacity and other factors.

Figure 5:
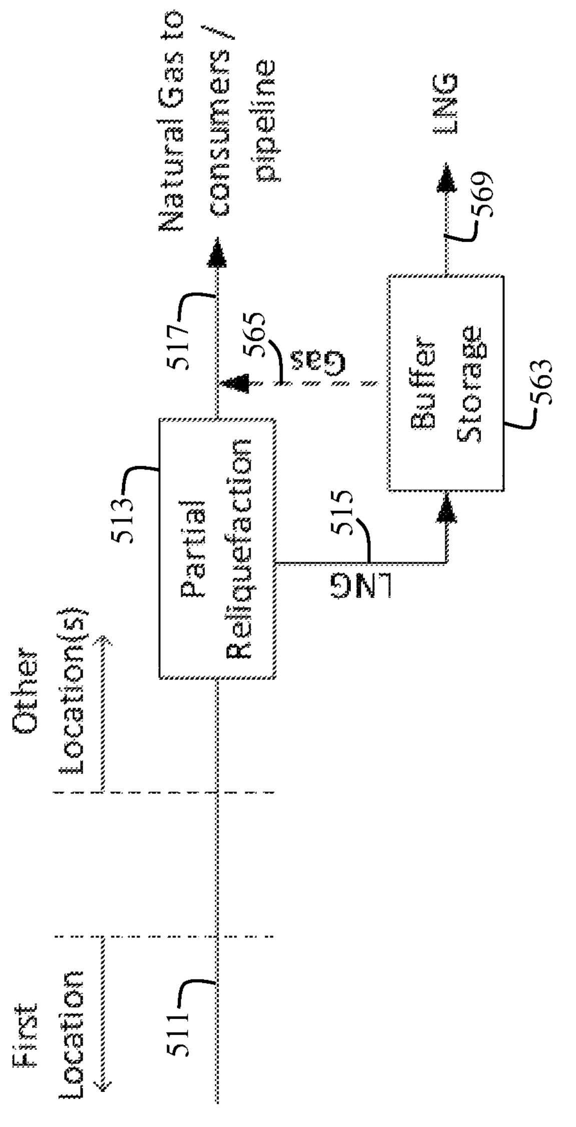
FIG. 5 is an exemplary configuration of LNG processing having regasification at a first location and partial reliquefaction with a buffer storage tank at a second location.

An exemplary configuration of LNG processing between a first location and a second location with partial reliquefaction and buffer storage at the second location is depicted in FIG. 5. Vaporized LNG 511 at a pressure above a consumer pressure can be produced in a first location as discussed herein (e.g., LNG processing schemes of FIGS. 1-2, etc.). Vaporized LNG 511 is transported from the first location to a second location at a non-cryogenic temperature (e.g., ambient temperature). Preferably, vaporized LNG 511 is a pretreated vaporized LNG meaning that it was pretreated to remove at least some water, $CO_2$, and $C_5$+ hydrocarbons prior to transporting the vaporized LNG to the second location.

At the second location, a reliquefaction unit 513 receives vaporized LNG 511 to thereby produce a natural gas product 517 at the consumer pressure and a reliquefied natural gas product 515. Preferably, refrigeration content from expansion of at least a portion of vaporized LNG 511 is used to partially reliquefy vaporized LNG 513. Exemplary reliquefaction schemes are shown in FIGS. 3-4.

Reliquefied natural gas product 515 can be stored in a buffer storage tank 563. Reliquefied natural gas product 515 in buffer storage tank 563 can be regasified to produce a regasified natural gas product 565, which can be used to supplement, or replace, natural gas product 517 that is supplied to downstream consumers. This can be beneficial when there is a disruption with the supply of natural gas product 517 to downstream consumers. Additionally, or alternatively, LNG 569 can be supplied to downstream consumers.

It is contemplated that reliquefied natural gas 515 in buffer storage tank 563 can be pumped to the consumer pressure prior to vaporization to produce regasified natural gas product 565 at the consumer pressure. In some embodiments, a supply rate of natural gas product 517 to a downstream consumer can be monitored, such that regasified natural gas product 565 can be fed to the downstream consumer when the supply rate falls below a predetermined threshold. The predetermined threshold can be a rate below 1%, 1-5%, 5-10%, 10-25%, 25-50%, or 50%-75% the supply rate. Typically, buffer storage tank 563 is sized and dimensioned to receive reliquefied natural gas 563 sufficient to produce regasified natural product 565 to supply downstream consumers for at least 2 hours, 4 hours, 6 hours, 12 hours, or 24 hours.

It is contemplated that regasified natural gas product 565 can be fed to the downstream consumer to increase the supply rate to at least the predetermined threshold. For example, regasified natural gas product 565 can be fed to the downstream consumer to increase a supply rate that has decreased below a predetermined threshold to (i) the predetermined threshold, (ii) the supply rate, or (iii) another rate above the supply rate when there is a demand for greater supply.

Figure 6:
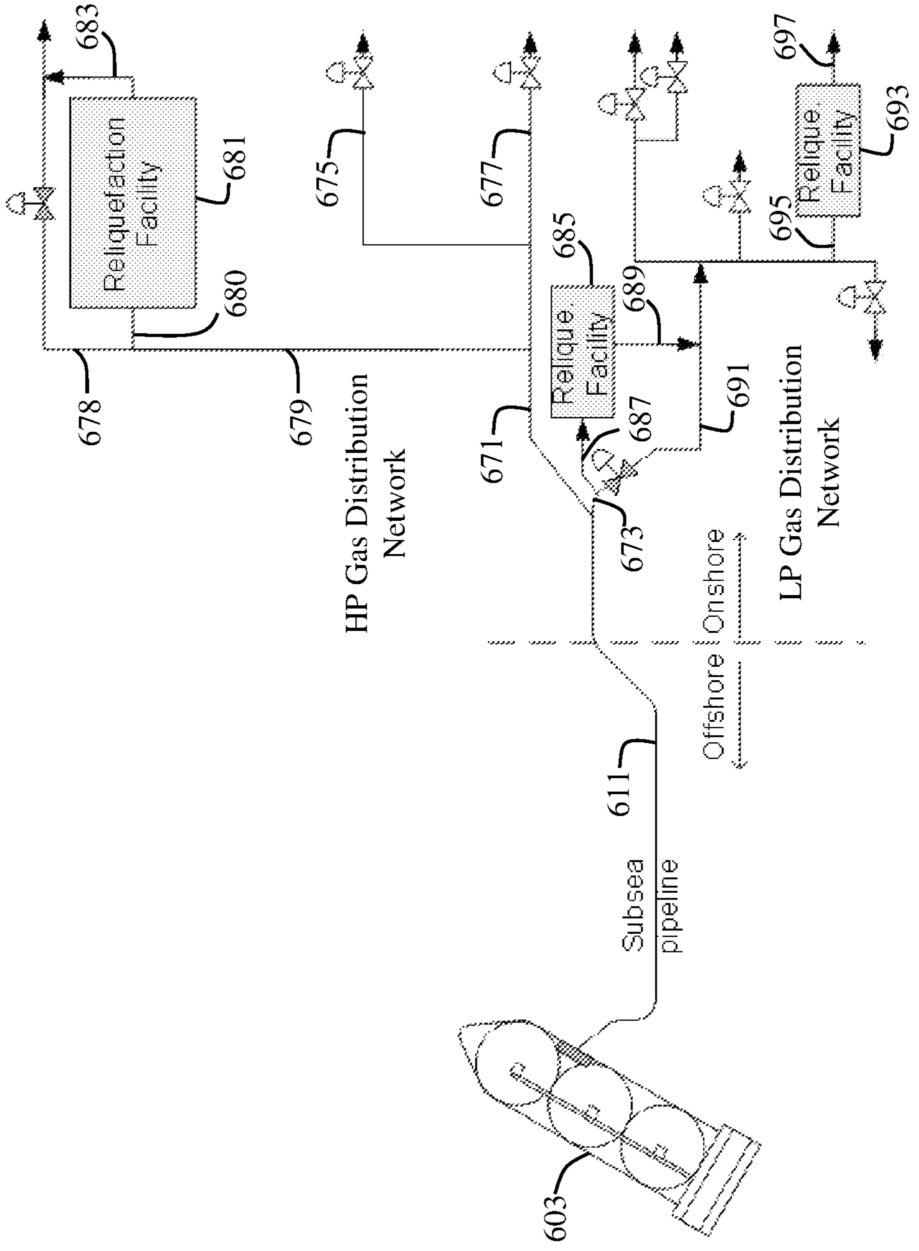
FIG. 6 is an exemplary configuration of offshore LNG regasification with an onshore natural gas distribution network.

In some embodiments, the second location can comprise a gas distribution network that supplies a plurality of consumers at different consumer pressures. An exemplary configuration of such scheme is depicted in FIG. 6. LNG source 603 is located on an FSRU, which pumps LNG to a pressure above a consumer pressure and vaporizes the pressurized LNG to form vaporized LNG 611. It is contemplated that the consumer pressure is the feed pressure required by the gas distribution network to provide natural gas to its downstream consumers. In other words, the consumer pressure can be at least the highest pressure required by a downstream consumer of the network. However, in other embodiments, the consumer pressure can be a pressure required by a downstream consumer of the network (e.g., a consumer in a high pressure area of the network and a consumer in a low pressure area of the network) or a pressure required by a portion of the network (e.g., pressure in the high pressure gas distribution transmission lines, pressure in the low pressure gas distribution transmission lines).

Vaporized LNG 611 is transported from an offshore location to a gas distribution network on an onshore location. For example, a subsea transmission line from the FSRU can be used to transport vaporized LNG 611 to both a high and a low pressure distribution network and a collection of consumers feeding off the pressure transmission lines.

The vaporized LNG 611 is separated into a first stream 671 and a second stream 673. First stream 671 is fed to the high pressure gas distribution network and can be further separated into multiple streams to supply a downstream consumer. For example, vaporized LNG can be at a pressure of 70 bar(g) offshore and transported onshore where it arrives at 58 bar(g) and is separated into first stream 671 and second stream 673. First stream 671 can be separated into a first high pressure stream 675 and a second high pressure stream 677, and expanded to supply a downstream consumer at 25 bar(g) and 53 bar(g) respectively. Typically, such downstream consumer also requires a lower pressure stream (e.g., 2.5 bar(g)), which provides a good location for a reliquefaction unit due to the amount of excess pressure available.

A third stream 679 in the high pressure gas distribution network can be separated into a first stream 678 and a second stream 680. First stream 678 can be expanded to the low pressure requirement of the downstream consumer. Second stream 680 can be partially or wholly reliquefied in a first reliquefaction unit 681 to generate a reliquefied natural gas product and a natural gas product as discussed above. It is contemplated that at least a portion of the reliquefied natural gas product can be regasified to form a regasified natural gas product 683 to supply the downstream consumer. Suitable downstream consumers in a pressure gas distribution network include large industrial consumers, such as cement factories or natural gas/dual fuel engine power generation facilities, that need gas at relatively low pressures 2.5-5 bar(g) but may be connected to transmission lines often operating at 30-50 bar(g).

Second stream 673 is fed to a low pressure distribution network. Typically, vaporized LNG is reduced in pressure at a pressure reduction station to distribute natural gas to low pressure consumers (e.g., glass factories, plastic bottling facilities, cigarette factories, soap and detergent facilities, breweries, etc.) that typically operate at 10 bar(g). Thus, a second reliquefaction unit 685 can receive a first portion 687 of second stream 673 to generate a reliquefied natural gas product and a natural gas product 689 at the pressure of the low pressure gas distribution network. A second portion 691 of second stream 673 can be expanded to the pressure of the low pressure gas distribution network. An exemplary pressure of second portion 673 is 58 bar(g) and of the low pressure gas distribution network is 9 bar(g), which illustrates the excess pressure available to generate reliquefied natural gas product.

Additional reliquefaction units can be disposed in the low pressure gas distribution network at additional pressure reduction stations of downstream consumers. For example, a third reliquefaction unit 693 can receive a first portion 695 of gas in the low pressure gas distribution network to thereby generate a reliquefaction product and a natural gas at a consumer pressure. An exemplary consumer pressure of a downstream consumer in the low pressure gas distribution network is approximately 1-2 bar(g) and the pressure in the low gas distribution network is approximately 10 bar(g), which provides excess pressure of approximately 8-9 bar(g) to generate refrigeration content to produce a reliquefied natural gas product.

It should be appreciated that a reliquefied natural gas product can be generated in a variety of locations as shown in FIG. 6. For instance, reliquefaction units can be provided at a range of locations ranging from onshore near an FSRU to well downstream on the pipeline network. Preferred configurations will be those with access to the largest gas sources and the greatest excess pressure.

Figure 7:
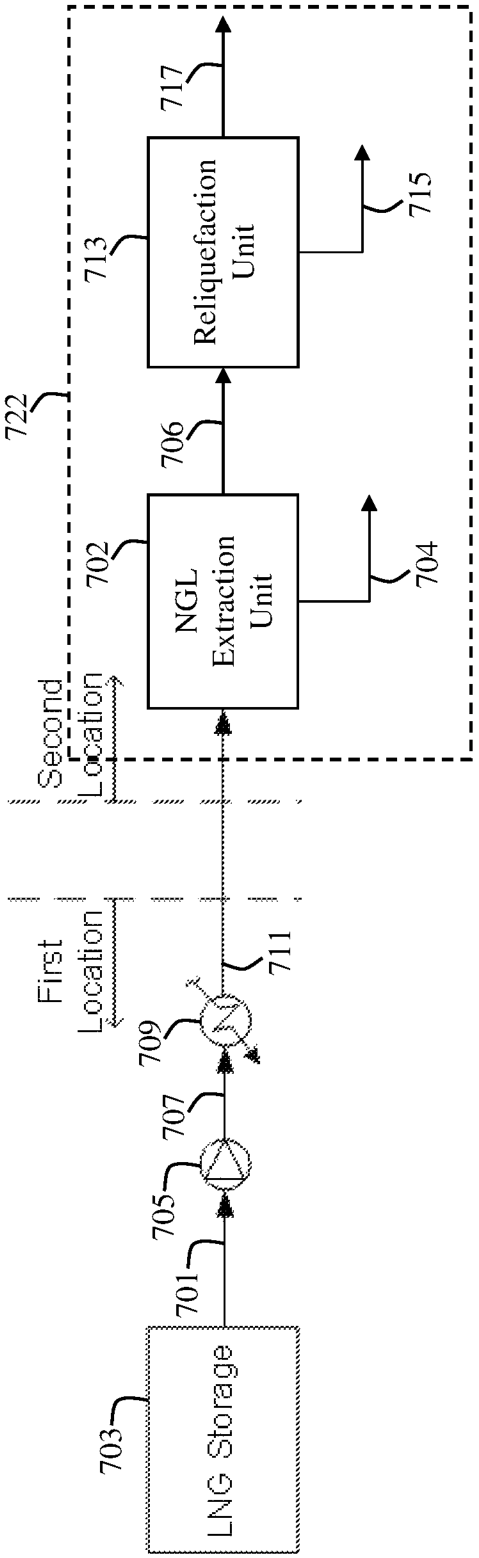
FIG. 7 is an exemplary configuration of LNG processing having regasification at a first location and partial reliquefaction and NGL recovery at a second location.

In some embodiments, it is contemplated that the partial reliquefaction scheme disclosed herein can be integrated in an NGL extraction process. These embodiments could include NGL extraction upstream or downstream of the partial reliquefaction scheme. Alternatively, the partial reliquefaction scheme and the NGL extraction process can be integrated to yield LNG, a natural gas product and NGL. An exemplary configuration of a partial reliquefaction and NGL process is depicted in FIG. 7. Similar to the embodiments discussed above, LNG 701 from an LNG source 703 is pumped to a pressure above a consumer pressure to produce a pressurized LNG 707 using a pump 705. Pressurized LNG 707 is vaporized to form a vaporized LNG 711 at a non-cryogenic temperature, which is transported from a first location to a second location.

At the second location, it is contemplated that at least a portion of vaporized LNG 711 can be processed in an NGL extraction unit 702 to remove at least some non-methane components and form a lean natural gas product 706 and an NGL product stream 704. It is contemplated that NGL extraction unit 702 can comprise an absorber to produce an absorber bottom product, and at least one downstream column to produce at least one of an ethane product and a propane and heavier product from the absorber bottom product, such as the NGL process disclosed in Mak (U.S. Pat. No. 8,110,023), which is hereby incorporated. It is contemplated that NGL product stream 704 is at least one of the ethane product and the propane and heavier products.

Lean natural gas product 706 can be partially reliquefied in a reliquefaction unit 713 to form a reliquefied natural gas product 715 and a natural gas product 717 at consumer pressure. As discussed above, it is contemplated that at least a portion of reliquefied natural gas product 715 can be stored in a buffer tank and can be regasified to supply natural gas to a downstream consumer. It should be appreciated that NGL extraction unit 702 and reliquefaction unit 713 can be integrated together to form an integrated unit 722.

Figure 8:
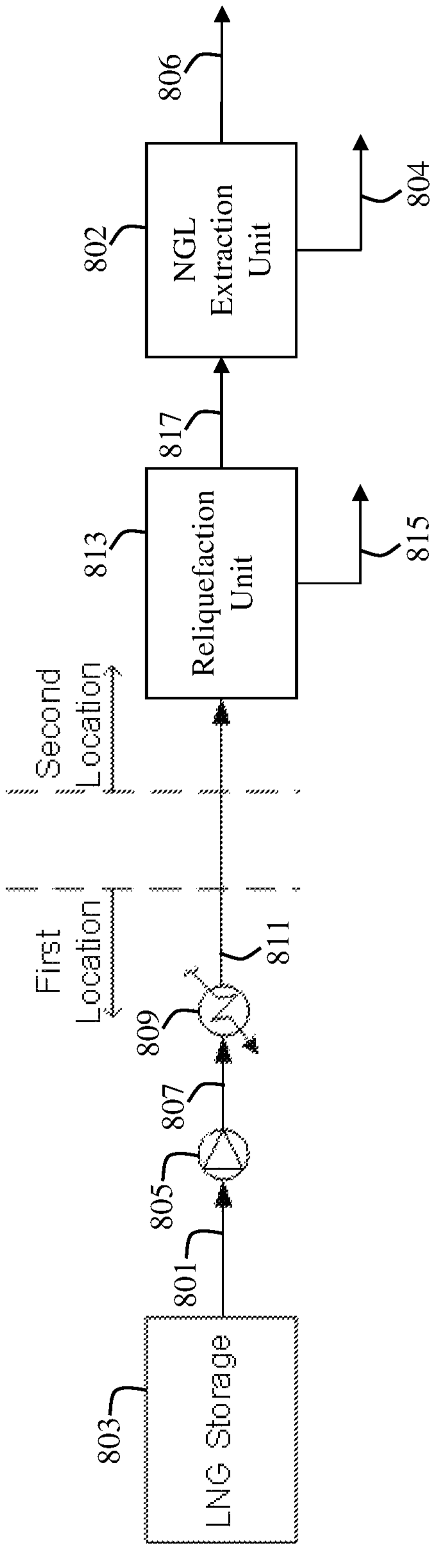
FIG. 8 is another exemplary configuration of LNG processing having regasification at a first location and partial reliquefaction and NGL recovery at a second location.

Another exemplary configuration of a partial reliquefaction and NGL process is depicted in FIG. 8. LNG 801 from an LNG source 803 is pumped to a pressure above a consumer pressure using a pump 805. Pressurized LNG 807 is heated using a vaporizer 809 to form vaporized LNG 811. Vaporized LNG 811 can be transported from a first location to a second location at a non-cryogenic temperature.

A reliquefaction unit 813 can receive vaporized LNG 811 to form a reliquefied natural gas product 815 and a natural gas product 817. It is contemplated that natural gas product 817 can be further processed to remove at least some non-methane components in an NGL extraction unit 802 to thereby form an NGL product stream 804 and a lean natural gas product 806 to supply a downstream consumer.

As discussed above, LNG is typically pumped to a pressure that is higher than the consumer pressure. However, in other contemplated embodiments, LNG can be pumped to a pressure equal to or below the consumer pressure prior to vaporization and transport to the second location. In such embodiments, the second location can comprise at least one compressor configured to increase the pressure of at least a portion of the vaporized LNG to the consumer pressure.

The discussion above provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. Also, as used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Moreover, and unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A method of providing a reliquefied natural gas product at a second location, comprising:
- providing liquefied natural gas ("LNG") from an LNG source;
- pumping the LNG to a pressure above a consumer pressure to thereby form pressurized LNG;
- vaporizing the pressurized LNG at a first location to thereby form a pressurized natural gas;
- transporting the pressurized natural gas from the first location to the second location;
- splitting, at the second location, the pressurized natural gas into a first stream and a second stream;
- expanding, at the second location, the second stream of the pressurized natural gas to a second pressure to generate a mixed product stream;
- separating the mixed product stream into;
- an overhead product stream having a refrigeration content, and a reliquefied natural gas product;
- before the step of expanding cooling the second stream of the pressurized natural gas product using the refrigeration content of the overhead product stream; and
- combining the first stream and the overhead product stream to generate a natural gas product.

2. The method of claim 1, wherein the LNG source comprises an LNG storage tank.

3. The method of claim 1, wherein the first location is offshore and the second location is onshore.

4. The method of claim 1, wherein the first location is a floating storage and regasification unit ("FSRU"), a gravity-based structure ("GBS"), an LNG production plant, or an LNG receiving terminal.

5. The method of claim 4, wherein the second location is an LNG production plant, an LNG regasification plant, or a natural gas distribution plant.

6. The method of claim 1, wherein the first location and the second location are separated by a distance of at least two kilometers.

7. The method of claim 1, wherein the step of transporting comprises transporting the pressurized natural gas at a non-cryogenic temperature.

8. The method of claim 1, wherein the method further comprises steps of (i) cooling the pressurized natural gas in a heat exchanger to thereby generate a cooled product stream and (ii) expanding the first stream below the consumer pressure to form an expanded first stream, wherein the expanded first stream provides refrigeration to the pressurized natural gas.

9. The method of claim 1, wherein the step of expanding is performed with minimal pretreatment to remove at least some impurities incompatible with cryogenic processing.

10. The method of claim 1, wherein the second pressure is below the consumer pressure.

11. The method of claim 1, wherein the pressurized natural gas is transported between the first and second location by a pipeline.

12. The method of claim 1, wherein the step of expanding is performed by at least one of an expansion valve, a turboexpander, a flashing liquid turbine, and a hydraulic turbine.

13. The method of claim 1, wherein the second location is a pressure reduction station, a pressure letdown station or a facility affecting a reduction in pipeline operating pressure.

14. The method of claim 1, wherein the second location is a pipeline compressor station.

15. The method of claim 1, further comprising removing, via a molecular sieve, at least some water from the pressurized natural gas at the second location.

16. The method of claim 8, wherein the expanded first stream provides refrigeration to the second stream.

17. The method of claim 1, wherein the overhead product stream provides refrigeration to the pressurized natural gas.

* * * * *